United States Patent

[11] 3,625,762

[72] Inventor Nick Kappas
 5486 Madison St., Gary, Ind. 46408
[21] Appl. No. 838,406
[22] Filed July 2, 1969
[45] Patented Dec. 7, 1971

[54] CLEANING SOLUTION AND METHOD AND APPARATUS FOR USING THE SAME
5 Claims, 4 Drawing Figs.
[52] U.S. Cl. .................................................. 134/10,
 134/2, 134/32, 134/36, 134/40, 252/135, 252/156
[51] Int. Cl. ....................................................... B08b 3/04
[50] Field of Search ........................................... 134/2, 32,
 36, 40, 10, 13; 252/135, 156

[56] References Cited
UNITED STATES PATENTS
3,257,325 6/1966 Koster ........................... 252/135
3,490,467 1/1970 Gore .............................. 134/36 X
OTHER REFERENCES
D. T. Chow et al. Andl. Chem, 25, 646– 8 (1953)
A. M. Lawson et al., Andl. Chem., 27, 1810– 11 (1955)

Primary Examiner—Morris O. Wolk
Assistant Examiner—Sidney Marantz
Attorney—Hood, Gust, Irish & Lundy ABSTRACT: A cleaning solution comprising water, about 2.5 to about 4.0 liquid ounces of a caustic and water solution having a density of about 11.67 pounds per gallon for each gallon of water, and about 1.5 to about 4.0 liquid ounces of a sodium silicate and water solution having a density of about 12.67 pounds per gallon for each gallon of water. The apparatus of the invention includes a bath, two separate tanks separately connected to the bath and having separate valves for independently metering the contents of the tanks into the bath as desired. The bath is preferably stationary and the tanks are preferably portable and easily attached and detached from the bath. A specific tank for use with the bath has a fill opening, a vent and a valve attached to the tank. Articles to be treated by the solution are placed within the solution in accordance with the method of the invention and the concentrations of hydroxide and silicate are periodically determined in a sample of the solution, and both additional caustic solution and the sodium silicate solution are metered into the bath to maintain desired concentration levels.

PATENTED DEC 7 1971 3,625,762

INVENTOR
NICK KAPPAS
by Hood, Gust, Irish & Lundy
Attorneys

CLEANING SOLUTION AND METHOD AND APPARATUS FOR USING THE SAME

BACKGROUND OF THE INVENTION

1. Field of the Invention

The present invention relates to a method and apparatus for treating articles in a solution having ingredients that are consumed by the treatment of the articles in the solution and which form a substance not soluble in the solution at predetermined concentration levels. More particularly, the present invention relates to an improved cleaning solution which can be used in place of, and which has improved properties over, a conventional anhydrous sodium orthosilicate cleaning solution and a method and apparatus for treating articles with the solution.

2. Description of the Prior Art

Industry has long been plagued with problems relating to the treatment of articles in solutions having ingredients which are consumed by the treatment of the articles and which may combine to form substances not soluble in the solution at predetermined concentration levels. One of these troublesome solutions is the silicate-caustic cleaning solutions used to clean metal articles. Such solutions generally comprise caustic, silicate, certain phosphates, soda, and other minor ingredients. Heretofore, solutions of this kind have been either completely premixed or the ingredients have been premixed in power form such that upon the addition of water, a solution ready for use is formed.

However, both the caustic and the silicate of the solution are consumed during the cleaning of metal articles. The consumption of the caustic is greater than the consumption of the silicate. The additional consumption of the caustic is largely attributed to certain saponification reactions which caustic undergoes with the oil on the articles being cleaned. Thus, during use, the concentration of the caustic in the solution is constantly decreasing at a rate faster than the silicate in the solution. At the higher concentrations of silicate which result due to the faster rate of consumption of the caustic during the use of the solution, silica substances form which are not soluble in the solution.

The problems caused by silica substances dropping out of solution are well known. Such silica substances can deposit on and coat metals or form a jell in the solution. These coatings and jells are very difficult to remove, especially after hardening. Such problems not only result in the equipment failure and maintenance problems, but also usually result in the equipment being constructed with special piping, pumps, and extra equipment to both prevent such substances from forming and to facilitate the removal of any deposit that may result therefrom. Conventionally, baths are provided to control the temperature of the solution in an attempt to keep the silicate in solution.

Conventionally, as the caustic is consumed during the use of the solution, additional caustic solution is added to the solution. This, of course, will change the concentrations of the bath and the $Na_2O$ to $SiO_2$ ratio from desired levels. These changes both effect the cleaning action of the solution and, together with any changes in temperature of the solution as above mentioned, tend to exaggerate the rate at which silica substances are formed.

Conventionally, an anhydrous sodium orthosilicate solution having a $Na_2O$ to $SiO_2$ ratio of about 2.07 to 1 is used for cleaning metal articles. Periodically, caustic is added to the solution. When the $Na_2O$ to $SiO_2$ ratio becomes low and cleaning action of the solution becomes undesirable, the solution is discarded.

For the reasons above mentioned, it is desirable to provide an apparatus and method for treating articles in a solution having a plurality of ingredients, at least one of which is consumed by the treatment of the articles by the solution and which when mixed may form a substance which is insoluble in the solution at predetermined concentration levels. Also, it is desirable to provide an improved caustic-silicate cleaning solution which can be used in lieu of a conventional anhydrous sodium orthosilicate solution and which is less expensive to use both in terms of cost of solution and original equipment and in terms of equipment downtime or equipment failure and maintenance.

SUMMARY OF THE INVENTION

It is therefore a primary object of this invention to provide an improved method and apparatus for treating articles with a solution having a plurality of ingredients, at least one of which is consumed by the treatment of the articles and which when mixed into a solution may form a substance insoluble in the solution at predetermined concentration levels.

Another object of this invention is to provide an improved caustic-silicate cleaning solution which is both less expensive than a conventional anhydrous sodium orthosilicate solution both in terms of cost of solution and original equipment and in terms of equipment downtime or failure and maintenance.

A further object of this invention is to provide an improved caustic-silicate cleaning solution and an improved method and apparatus for cleaning metal articles with said solution which is less expensive to use both in terms of original equipment and solution costs and in terms of equipment downtime or failure and maintenance.

In the broader aspects of this invention there is provided an improved caustic-silicate cleaning solution having a $Na_2O$ to $SiO_2$ ratio between about 1.4 to 1 and about 4.1 to 1. An apparatus is provided having a bath and two separate tanks connected to the bath by means for independently metering the contents of the tanks, respectively, into the bath as desired. A method is provided comprising the steps of determining the concentrations of at least two of the ingredients of a solution and metering additional amounts of the two ingredients into the solution to maintain a desired concentration level.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
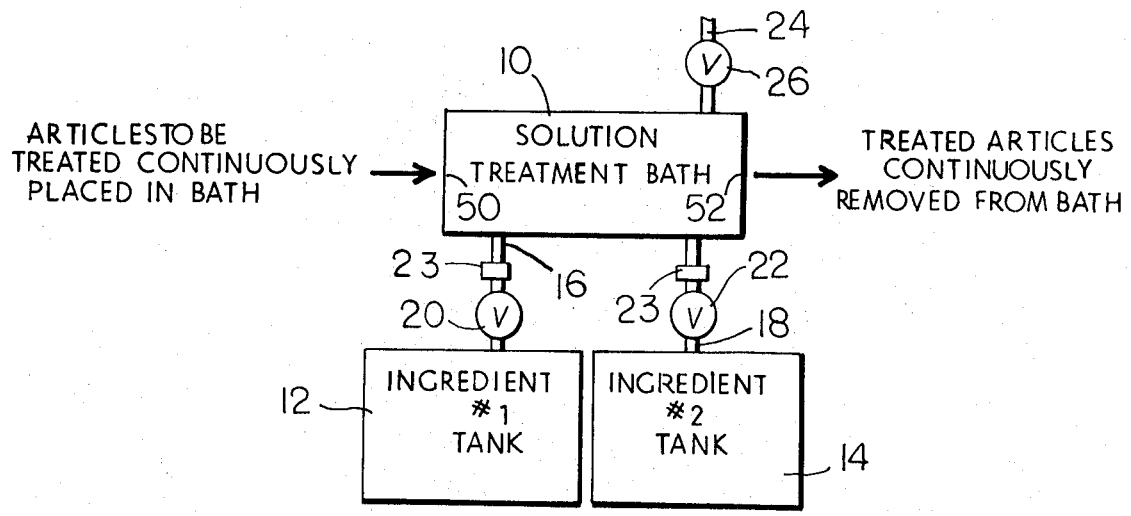
FIG. 1 is a diagrammatic illustration of the apparatus of this invention.

Referring to the drawings, there is shown the apparatus of this invention. This apparatus comprises a bath 10 and at least two tanks 12, 14. Tanks 12, 14 are connected to the bath 10 by lines 16, 18, respectively. Operatively connected to the lines 16, 18 are valves 20 and 22. In a preferred embodiment, bath 10 is also provided with a sampling line 24. A valve 26 is operatively connected to the line 24.

Referring now to the tanks 12 and 14, a specific tank which can be used for either tank 12 or 14 in the performance of the method of this invention will now be described. Preferably, the bath 10 is fixed and both the tanks 12 and 14 are portable. Since both of the tanks 12 and 14 can be identical, a description of one will suffice for both of them.

Figures 2, 3, 4:
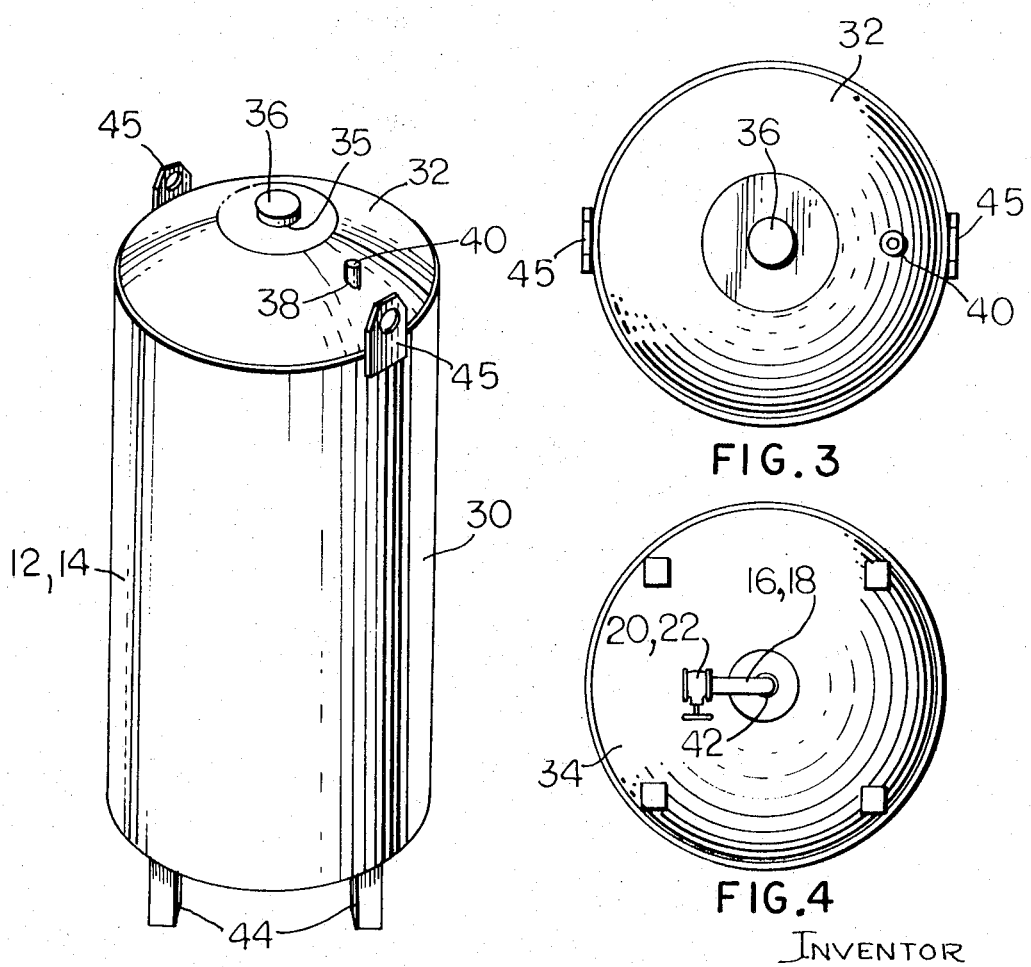
FIG. 2 is a perspective view of a preferred embodiment of the ingredient tanks diagrammatically illustrated in FIG. 1.
FIG. 3 is a top view of the tank illustrated in FIG. 2.
FIG. 4 is a bottom view of the tank illustrated in FIGS. 2 and 3.

Referring now specifically to FIGS. 2, 3 and 4, there is shown a tank having a body 30. Body 30 has a top 32 and a bottom 34. Top 32 has a fill opening 35 therein. Fill opening 35 is preferably positioned in the highest portion of the tank body 30. A cap 36 is provided to close the fill opening 35 when desired. Top 32 also has a vent opening 38. Vent opening 38 must be located above the level of the liquid in the tank at all times. Operatively connected to the vent opening 38 is a pressure release valve 40.

The bottom 34 has a discharge opening 42 therein. Discharge opening 42 is connected to lines 16, 18 aforementioned. Preferably, the discharge opening 42 is located in the lowest portion of the tank bottom 34. Connected to the body 30 are a plurality of legs 44. Legs 44 support the tank body 30 so as to space the bottom 34 from a supporting surface. Preferably, the valves 20, 22 are located within the space between tank bottom 34 and the supporting surface. Secured to the body 30 adjacent to the top 32 are a plurality of crane eyes 45. Crane eyes 45 must be located above the center of gravity of the tank when empty and must be secured to opposite portions of the body 30.

Referring now to the improved caustic-silicate solution of the invention, reference will be made to the following example:

A solution was formed from the following ingredients:
Water;
A caustic and water solution having a density of about 11.67 pounds per gallon (purchased commercially as a 50 percent caustic solution); and
A sodium silicate and water solution having a density of about 12.67 pounds per gallon (purchased commercially as sodium silicate Grade 40).

The caustic solution was added to the water and thoroughly mixed. About 2.5 to about 4.0 liquid ounces of caustic solution was added for each gallon of water. The silicate solution was then added to the water and caustic and water solution. About 1.5 to about 4.0 liquid ounces of silicate solution were added for each gallon of water. The silicate solution must always be added to the water after the caustic solution is added to the water to prevent silica substances from forming and depositing on the container for the solution or any articles within the container. For this reason, the caustic solution and the silicate solution must be also stored in separate containers prior to adding them to the water to form the desired solution. Generally, the higher the silicate concentration in the solution, the more likely that silica substances which are partially insoluble in he solution will form. In this regard, the highest concentration of the range of silicate concentrations mentioned above has been determined to be the highest silicate concentration at which the solution of the invention can be used without subjecting the user to a significant risk of silica substances forming. The lowest concentration of the range of concentrations mentioned above, in contrast, was determined to be the lowest concentration of silicate in solution which will give the solution the desired cleaning action.

The resulting solution was used to clean metal articles. During the cleaning of the metal articles the hydroxide concentration of the solution was determined periodically by titrating a sample of the solution, in accordance with test procedures described hereinafter and calculating the caustic concentration from the end point. It was noted that the hydroxide concentration decreased as the solution was being used for cleaning the above-mentioned metal articles. Also, the silicate concentration of the solution was determined periodically by sampling the solution and determining the silicate concentration by a conventional color photometric method, also described hereinafter. It was noted that the silicate concentration also decreased as the solution was being used for cleaning the metal articles above mentioned.

Both caustic solution and silicate solution were added to the solution to maintain concentrations in the above-given concentration ranges.

In a specific cleaning operation conducted in the manner above described, the caustic solution concentration was maintained on the average at about 2.8 liquid ounces per gallon of water and the sodium silicate solution concentration was maintained on the average at about 2.7 liquid ounces per gallon of water. During this same cleaning operation, the $Na_2O$ to $SiO_2$ ratio was maintained at about 2.07 to 1.

During this operation, however, approximately 2.2 gallons of caustic solution was consumed for every gallon of silicate solution consumed. Theoretically, only about 1.25 gallons of caustic solution should be consumed for every gallon of silicate solution consumed at a $Na_2O$ to $SiO_2$ ratio of 2.07 to 1. The added consumption of the caustic solution was determined to be largely due to the saponification of oils on the metal articles being cleaned.

During the experiment, $Na_2O$ to $SiO_2$ ratios varied from about 1.4 to 1 to 2.5 to 1 with no silica deposits being noted. Also, the experiment indicates that $Na_2O$ to $SiO_2$ ratios as high as 4.1 to 1 could also be used.

The experiment further established that the sodium silicate solution and the caustic solution could not be premixed prior to use. Silicate precipitation or the formation of silica substances which result in deposits of the type above mentioned are appreciably more pronounced at the concentrations present in such premixed solutions.

Referring now to the method of the invention, the operation of the apparatus illustrated in FIGS. 1 through 4 will now be described. The description will relate to the cleaning solution above mentioned, it being understood that both the apparatus and method of this invention relate to the use of other solutions which include a plurality of ingredients at least one of which is of the type that may form a substance insoluble in the solution at predetermined concentration levels of the ingredients. Further, each of these other solutions are of the type which have ingredients at least one of which is consumed during the use of the solution.

The method of the invention comprises providing the solution and placing the solution in bath 10. The articles to be treated are placed within the bath 10. If the treating of the articles is to be a continuous process, the bath 10 is provided with an inlet portion 50 and an outlet portion 52. The articles to be treated are placed in solution at the inlet portion 50, moved through the solution in a substantially submerged state to the outlet portion 52 at which point the articles emerge from the solution.

The aforementioned water and caustic solution is placed within tank 12. Similarly, the aforementioned sodium silicate and water solution is placed within tank 14. Each of these tanks 12, 14 is preferably a tank such as that illustrated in FIGS. 2 through 4 and above described. These tanks can be filled by meaNs of the fill opening 34 at a location remote from the bath 10. Once filled, the cap 36 can be used to close the fill opening 35 and to prevent leakage and contamination of the solution. The pressure relief valve 40 and vent opening 38 allow the pressure to be controlled within the tank. After filling, a crane can be connected to the eyes 45 and the tank can be lifted and carried to a position adjacent to the bath 10. Once adjacent to the bath 10, tanks 12, 14 can be connected to the bath by means of the line 18, 20. Preferably a coupling 23 is provided in each of the lines 18, 20 such that the tanks 12, 14 can be easily connected and disconnected from the bath 10 as desired. The legs 44 of the tanks 12, 14 support the tank body 30 in spaced relation with a supporting surface such that the valves 20, 22 can be located beneath the tank and be readily accessible to both operate and maintain in working condition.

As aforementioned, the cleaning of metal articles with the solution above described, consumes both caustic solution and silicate solution. For this reason, a sample of the solution in the bath 10 is collected periodically. This is achieved by using the solution sampling line 24. Both the hydroxide concentration and the silicate concentration in the sample is determined. The hydroxide concentration is determined by one of the following test procedures:

HYDROXIDE TEST PROCEDURE

Preferred test procedure

A 25 milliliters sample of solution is accurately measured. A few drops of phenolophthalein indicator is added to the sample. The sample is titrated with a 1.0 normal solution of hydrochloric acid until an end point is reached. The number of milliliters of hydrochloric acid used to reach the end point is multiplied by 0.385. The resulting product corresponds to the number of ounces of caustic solution per gallon of water contained in the solution.

Other test procedures

The same test procedure described above with reference to phenolphthalein indicator can be performed with any one of the following indicators:

Methyl orange indicator
Bromphenol blue indicator

The concentration of silicates in the sample can be determined by the following test procedure:

SILICATE TEST PROCEDURE

A solution sample is heated slightly and mixed thoroughly. The sample is then filtered through a No. 30 filter paper. A one milliliter aliquot sample of the filtrate is placed in a 100 milliliter volumetric flask. Twelve drops of C.P. grade 50 percent sulfuric acid is added to the filtrate and the solution is diluted to equal a total of 100 milliliters by adding distilled water. The 100 milliliter solution is mixed thoroughly. 25 milliliters of the 100 milliliter sample is placed in a 250 milliliter beaker. 2 milliliters of an ammonium molybdate solution consisting of 10 percent volume ammonium molybdate and the remainder water is added to the 250 milliliter beaker. The resulting solution is mixed thoroughly and allowed to stand for 10 minutes. The transmittance of the solution in the 250 milliliter beaker is read on a conventional Bausch and Lomb Spectronic 20 Photometer at 450 millimeters using the small diameter tubes. The remaining portion of the sample in the 100 milliliter volumetric flask is used as the blank. The transmittance of the sample in the 250 milliliter beaker is compared with a previously prepared curve relating transmittance to silicate concentrations of known standards. The color developed in the solution within the 250 milliliter beaker will remain stable for at least 30 minutes. This provides sufficient time to accurately read the photometer. If at any time during the test the solution within the 100 milliliter flask becomes cloudy, this portion of the sample should be filtered once again through a relatively tight filter paper.

After the concentrations of the caustic solution and the silicate solution in the solution in the bath 10 have been determined, additional caustic solution or silicate solution as desired can be metered into the bath 10 by appropriately manipulating the valves 20 and 22, respectively. The caustic solution and silicate solution is selectively metered into the bath 10 to maintain solution concentrations for both the caustic solution and the silicate solution within the range above mentioned and to maintain a $Na_2O$ to $SiO_2$ ratio within the range above mentioned.

Referring now to the use of the caustic-silicate cleaning solution above described for the cleaning of metal articles, certain advantages over the conventional cleaning of such articles with the aforementioned conventional one component commercial anhydrous sodium orthosilicate solutions are apparent. First, the concentration of both the caustic solution and the silicate solution can be adjusted without altering the other. This means that both the concentrations and the $Na_2O$ to $SiO_2$ ratios can be adjusted to optimum values. In this way, the likelihood that silica deposits will form in he solution can be minimized and the cleaning action of the solution can be optimized. Second, both the commercial grade caustic solution and the commercial grade sodium silicate grade 40 solution, as purchased in commercial quantities is less expensive than commercial grade anhydrous sodium orthosilicate which is now conventionally being used. Third, because of the control over the concentrations of the ingredients in the solution resulting from the method and apparatus of the invention, less expensive original equipment can be used than previously could be used with the conventional sodium orthosilicate solutions and additional savings are experienced both in maintenance and equipment downtime or failure.

While there have been described above the principles of this invention in connection with specific apparatus, it is to be clearly understood that this description is made by way of example and not as a limitation to the scope of the invention.

What is claimed is:

1. A method of treating articles comprising the steps of providing a reusable solution, said solution having a plurality of ingredients, each of said ingredients being at a predetermined concentration, at least two of said ingredients being of the type that when mixed at concentrations differing from said predetermined concentrations form an undesirable substance which is insoluble in the solution, placing articles to be treated in said solution, the treatment of said articles consuming both of said two ingredients, the consumption of said two ingredients each occurring at a different rate, determining the concentration of one of said two ingredients, metering said one ingredient into said solution to maintain said predetermined concentration level thereof, determining the concentration of the other of said two ingredients, and metering said other ingredient into said solution to maintain said predetermined concentration level thereof.

2. The method of claim 1 wherein said solution is a caustic-silicate cleaning solution having a $Na_2O$ to $SiO_2$ ratio from about 1.4 to about 4.1 to 1.

3. The method of claim 1 wherein said reusable solution is a caustic-silicate cleaning solution having a $Na_2O$ to $SiO_2$ ratio from about 1.4 to 1 to about 2.5 to 1.

4. The method of claim 1 wherein said reusable solution comprises water, caustic and water solution and sodium silicate and water solution, said two ingredients respectively being a caustic and water solution and a sodium silicate and water solution, said predetermined concentration levels being from about 2.5 to about 4.0 liquid ounces of said caustic and water solution for each gallon of water and about 1.5 to about 4.0 liquid ounces of a sodium silicate and water solution for each gallon of water, said caustic and water solution having a density of about 11.67 pounds per gallon, said sodium silicate and water solution having a density of about 12.67 pounds per gallon.

5. The method of claim 4 wherein said predetermined caustic concentration is about 2.8 liquid ounces of said caustic and water solution per gallon of water and said predetermined sodium silicate concentration is about 2.7 liquid ounces of said sodium silicate solution per gallon of water.

* * * * *

UNITED STATES PATENT OFFICE
CERTIFICATE OF CORRECTION

Patent No. 3,625,762     Dated December 7, 1971

Inventor(s) Nick Kappas

It is certified that error appears in the above-identified patent and that said Letters Patent are hereby corrected as shown below:

IN THE SPECIFICATION

Col. 3, line 39, change "he" to ---the---.

Col. 4, line 42 - Change "meaNs" to ---means---.

Col. 6, line 1 - Change "he" to ---the---.

IN THE CLAIMS

Claim 2, col. 6, line 35 - before "solution" insert ---reusable---.

Claim 2, col. 6, line 37 - after "1.4 to" insert ---1 to---.

Signed and sealed this 1st day of August 1972.

(SEAL)
Attest:

EDWARD M. FLETCHER, JR.
Attesting Officer

ROBERT GOTTSCHALK
Commissioner of Patents